United States Patent [19]

Pye

[11] Patent Number: 5,192,369
[45] Date of Patent: Mar. 9, 1993

[54] APPARATUS FOR SPRAYING HARVESTED CROPS

[75] Inventor: Barry J. Pye, Luton, England

[73] Assignee: British Technology Group Ltd., London, England

[21] Appl. No.: 789,773

[22] Filed: Nov. 8, 1991

Related U.S. Application Data

[60] Continuation of Ser. No. 572,566, Aug. 27, 1990, abandoned, which is a division of Ser. No. 359,743, May 9, 1989, Pat. No. 4,971,818.

[30] Foreign Application Priority Data

Nov. 20, 1986 [GB] United Kingdom ............... 8627795

[51] Int. Cl.$^5$ .................................. B05D 1/04
[52] U.S. Cl. ............................ 118/624; 118/630; 118/634; 118/64
[58] Field of Search ............. 118/13, 621, 627, 629, 118/630, 632, 634, 635, 314, 680, 624, 64

[56] References Cited

U.S. PATENT DOCUMENTS

| | | | |
|---|---|---|---|
| 2,247,963 | 7/1941 | Ransburg et al. | 118/635 |
| 2,466,906 | 4/1949 | Miller | 264/24 |
| 2,585,799 | 2/1952 | Lawrence | 99/451 |
| 2,723,921 | 11/1955 | Starkey | 118/630 |
| 2,764,508 | 9/1956 | Feick | 118/634 |
| 2,889,805 | 6/1959 | Freeder | 118/634 |
| 2,980,337 | 4/1961 | Kozinski | 118/621 |
| 2,998,048 | 8/1961 | Sittel | 118/621 |
| 3,339,840 | 9/1967 | Point | 239/3 |
| 3,900,000 | 8/1975 | Gallen | 118/630 |
| 4,398,672 | 8/1983 | Arnold et al. | 239/703 |
| 4,597,533 | 7/1986 | Shirai et al. | 118/627 |
| 4,818,546 | 4/1989 | Whitford | 426/231 |
| 4,836,137 | 6/1989 | Heine et al. | 118/630 |

FOREIGN PATENT DOCUMENTS

| | | | |
|---|---|---|---|
| 1204873 | 5/1966 | Fed. Rep. of Germany . | |
| 2354143 | 1/1978 | France . | |
| 599466 | 3/1948 | United Kingdom | 118/634 |
| 1298063 | 11/1972 | United Kingdom | 118/630 |
| 1549961 | 6/1977 | United Kingdom . | |

Primary Examiner—Willard Hoag
Attorney, Agent, or Firm—Cushman, Darby & Cushman

[57] ABSTRACT

A spray apparatus for the treatment of a harvested crop, the apparatus including a high voltage electrostatic spray head, a sprayhood surrounding the sprayhead and having an aperture opposite the sprayhead and insulating means to suspend the sprayhood with the aperture adjacent a region of a conveying path to establish and maintain the sprayhood covering said region of said conveying path, the sprayhood having on the outside an insulating cover and inside the cover an extensive insulated electrode extending around and above said aperture, the electrode being energizable in operation to a potential similar to that applied to the sprayhead, whereby the support means and electrode together permit the application of an electrostatically charged spray from the sprayhead in a controlled manner throughout said region of the conveying path under the sprayhood to a quantity of crop conveyed past on the conveying path in a regular manner.

19 Claims, 2 Drawing Sheets

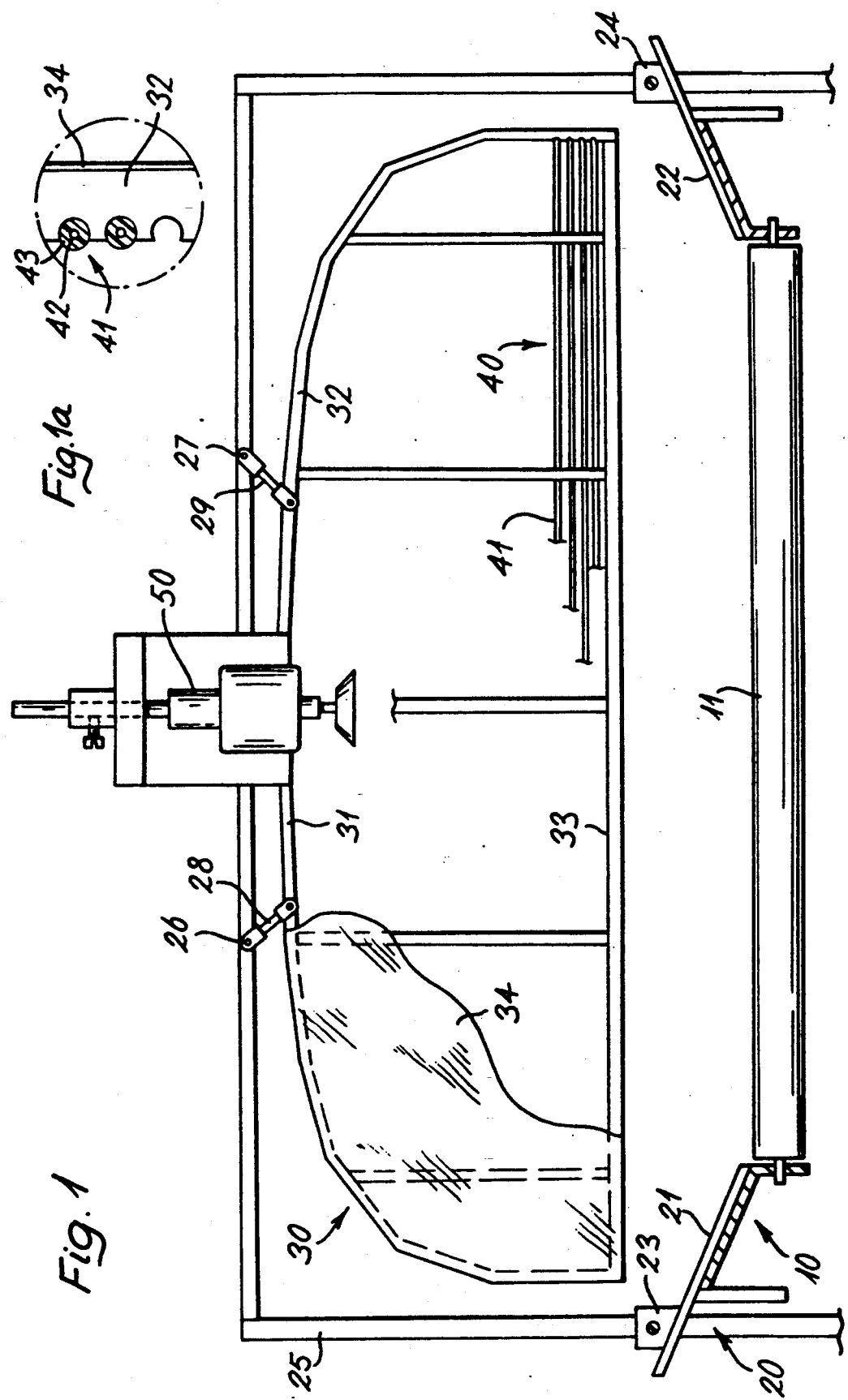

APPARATUS FOR SPRAYING HARVESTED CROPS

This is a continuation of application Ser. No. 07/572,566 file Aug. 27, 1990, now abandoned, which was a division of application Ser. No. 359,743, filed May 9, 1989, now U.S. Pat. No. 4,971,818.

This invention relates to the treatment of harvested crops, such as fruit and vegetables.

Harvested crops are often treated, for example before storage or on removal for planting or sale, to inhibit decay or pest attack or control the maturing of the crop. A convenient technique s to spray the crop, such as potatoes for food or seed or a fruit such as oranges, while it is on a conveyor. Regulations for the use of chemicals put close limits on the dosage of the crop and for this reason, and for economy and effectiveness, it is desirable that only the minimum required amount of chemical be applied uniformly to each item of the crop. Such uniform application should be made rapidly as treatment is a seasonal requirement and large quantities of crop need to be handled quickly, for example to prevent spoilage. Furthermore the apparatus by which the crop is treated has to be robust to withstand an agricultural or warehouse environment.

It is an object of the present invention to provide an apparatus for the efficient economic treatment of harvested crops.

According to the invention there is provided a spray apparatus for the treatment of a harvested crop, the apparatus including a high voltage electrostatic sprayhead, a sprayhood surrounding the sprayhead and having an aperture opposite the sprayhead and insulating means to suspend the sprayhood with the aperture adjacent a region of a conveying path to establish and maintain the sprayhood covering said region of said conveying path, the sprayhood having on the outside an insulating surface and inside an extensive insulated electrode extending around and above said aperture, the electrode being energisable in operation to a potential similar to that applied to the sprayhead, whereby the suspension means and electrode together permit the application of an electrostatically charged spray from the sprayhead in a controlled manner throughout said region of the conveying path under the sprayhood to a quantity of crop conveyed past on the conveying path in a regular manner.

The sprayhood is conveniently provided with a frame of ribs having on the inside means to receive an insulated wire to form the electrode. The insulating surface is conveniently shaped from sheet material to fit closely over the ribs. The hood may be of generally rectangular or square form with an apex at which the sprayhead is placed and may be wound over the inside, on the ribs, with an insulated wire as the electrode. The means to suspend the hood may be insulated suspension links extending from the sprayhood. The suspension means may be attached near to the apex of the hood. There may be support means for the sprayhood to which the insulating links extend. The support means may include guide means to constrain the crop to the conveying path. The spray may be controlled to be a uniform or other pattern across the conveying path.

The voltage applied to the electrode is of the same polarity as that of the charge on the spray and of similar potential. The sprayhead is arranged to produce spray particles of a VMD less than 100 microns.

BRIEF DESCRIPTION OF THE DRAWINGS

Embodiments of the invention will now be described with reference to the accompanying drawings in which:

FIG. 1 shows a cross-sectional elevation of a spray apparatus according to the invention, FIG. 1a is an enlargement of a portion of FIG. 1, and FIGS. 2A, 2B and 2C are graphs showing amounts of fungicide plotted against the number of potato tubers respectively from using three prior art apparatus.

In FIG. 1 a roller table conveyor of conventional form is shown in outline at 10 and a roller indicated at 11.

Figure 2A:
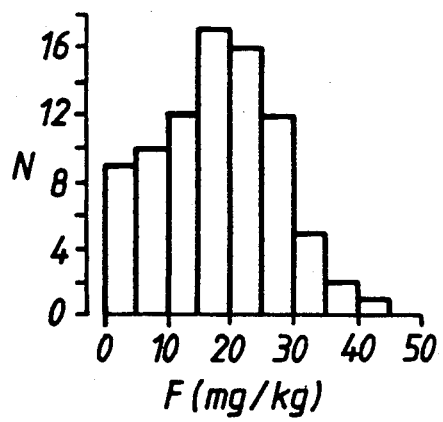
FIG. 2D is a graph showing amounts of fungicide plotted against the number of potato tubers using the present invention.

A support frame generally indicated at 20 is fitted to the roller table with sloping guide plates 21, 22 and height adjustment clamps 23, 24. The guide plates are conveniently shaped to fit snugly to the roller table without any fastening A support hoop 25 fits into the clamps to be held at a chosen height. Conveniently there are two hoops 25 spaced along the roller table in respective clamps on one set of guide plates. Each support hoop has two support points 26, 27. The four points are conveniently at the corners of a square. Adjustable insulating suspension means 28, 29, (not shown in detail) are attached to the support points to support a sprayhood indicated generally at 30. The suspension is arranged so that the hood is clear of any other structure. The hood is conveniently square in plan and dome-like in elevation and has an open end. In one embodiment the roller table is about one meter wide and the hood is thus about one meter square to cover a region which is a meter long and the whole width of the table. At the central top of the hood, opposite the open end, is an electrostatic spray head 50 preferably of the rotary type. The sprayhead is adjustable in height in the hood. The hood itself is about 300 millimeters high.

The hood is a light, simple structure but strong enough to resist hard use. In one embodiment the hood has a frame of four diagonal ribs extending from the central sprayhead mounting to the corners of the hood Two of these diagonal ribs are at 31, 32 and the suspension means 2B. 29 are attached to them. Frame elements such as 33 define the four sides of the opening of the hood. The sides of the hood are framed by subsidiary elements curved in elevation to shape the hood. Longitudinal stiffeners can be added if needed. The inside of the frame has a further function to carry an electrode 40. Electrode 40 is conveniently a length Of cable 41 wound around the inside of the hood frame, which is provided with notches, hooks, holes or like structures to receive and retain the cable 41 in a spaced arrangement of turns on the inside of the hood, somewhat as shown in FIG. 1a in the enlarged "scrap section". The winding extends from the bottom, open end, of the hood to the central top portion around the sprayhead to be all around and above the open end. Preferably the turns are about 10 millimeters apart. The end of the cable at the bottom of the hood is insulatingly sealed to be waterproof.

For the hood shown some thirty turns are involved so 100 to 150 meters of cable are needed to wind a hood. The conductor of the cable is connected at the top of the hood to a source of electrical potential of several thousand volts so a certain minimum overall diameter for the insulation of the cable is needed to avoid corona. In choosing the conductor part 42, which may be of copper or other metal, care is needed to ensure that this is large enough to avoid excessive voltage stress at the surface which could cause a discharge into the insulation 43. One suitable form is a flexible cable with a plain copper stranded 30/0.25 millimeters centre about 1.8 millimeter in diameter and a PVC sheath about 0.8 millimeter thick. As the cost of the electrode is a significant part of the cost of the whole apparatus care is needed in its choice. Other forms of conductor for the electrode are possible provided corona is avoided and a waterproof arrangement is used. Thus radial insulated conductors may be used, radiating from a connection at the top of the hood. A metallic film. e.g. deposited by spraying or silk screening on a plastic sheet material, could also be used if insulated. Thus the metallic film could be on the outside of a plastics sheet attached to the inside of the hood frame. Other constructions will be apparent to those skilled in the art. The spacing of the conductor turns in that form of the electrode is believed to be important. If too close too much electrode is needed. If too far apart the spray can wet the hood. If the ambient humidity is high precautions against "flashover" due to condensation on the sprayhead may be needed.

It is important that the electrode extends all round the open end of the sprayhood and above the area of the table inside the hood. This gives a uniformity of a spray application needed for the treatment of harvested crops.

A very convenient form of construction for the hood frame is plastic mouldings as these can be formed in sections, with the hooks, notches, holes etc. in place, to be welded or even "snapped" together.

Over the outside of the hood frame is an insulating surface of thin strong insulating material 34 such as polyethylene sheet. This can be shaped to be a close fit over the hood to keep the cover in place. The surface stops wind affecting the spray pattern. The apparatus can therefore be used out of doors as well as indoors and achieve controlled results.

The whole hood is suspended as described above so as to be adjustable in height from the roller table. It is believed that it is important for efficient operation that the insulating suspension ensures that the hood is clear of any other structure so that no leakage of charge can occur. Wetting of the hood by spray is also reduced when this is done. The suspended cage does not get wet so easily if it can not leak charge.

In use the electrode 40 is energised to control the charged spray fan from sprayhead 50 and the heights of the hood and sprayhead adjusted to produce a required area of uniform spray deposit on the crop on the roller table. A suitable sprayhead is described in UKPS 2073053 or its counterpart U.S. Pat. No. 4,398,672. If the hood is raised too far from the conveyor controlled application is affected.

The potential applied to the electrode is substantially the same as that applied to charge the spray. The sprayer is of the direct charge type which requires a potential of some tens of kilovolts. Typically a voltage in the range of 15 kilovolts to 30 kilovolts is used. The potential on the electrode need not be from the same source as that for the sprayer but is of the same polarity and preferably in a range between 10% below and above the sprayer potential. It has been found that a difference of more then 25% can cause the spray to be attracted to the hood which impairs the action of the apparatus. A negative polarity is preferred. Among other reasons a negative charge is "held" by polyethylene more effectively than is a positive charge. It is believed that the polyethylene sheet 34 outside the electrode, when kept dry, can charge between the electrode turns and assist in spray control.

The sprayhead typically requires 10 to 20 micro amperes and the electrode about one micro ampere.

The sprayhead is preferably arranged to operate at high speed to reduce the drop size. At a speed of 12000 rpm most droplets are smaller than 90 microns and a volume median diameter (VMD) of about 70 microns is achieved. Small, highly charged, drops are preferred as these do not get through the layer of crop to be wasted by landing on the roller table. The drops form a cloud which spreads rapidly because the drops are of the same polarity. The spread of the cloud is controlled by the field from the electrode so that the drops occupy a volume within which they spread by mutual repulsion to a relatively uniform distribution and so land on the crop on the roller table in a similar uniform distribution over an area set by the adjustments mentioned above. The extensive electrode mentioned above is important in bringing about the mutual repulsion of the drops to a uniform distribution inside the volume defined by the electrode.

More than one sprayhead can be used and equalisation of spray distribution is still achieved.

The one meter square hood is effective with roller table speeds for one half to two tons of crop such as potatoes per hour. The sprayhead can be set to deliver between 20 and 50 milliliters of spray per minute by control of supply pump. If required the spray dilution can also be adjusted to achieve a particular dosage.

The crop is rolled around by the roller table so that all parts are exposed.

Figure 2B:
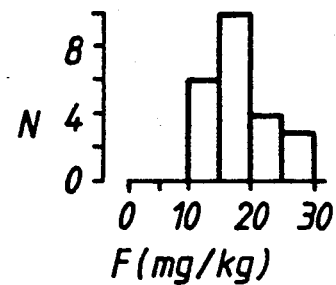
Figure 2C:
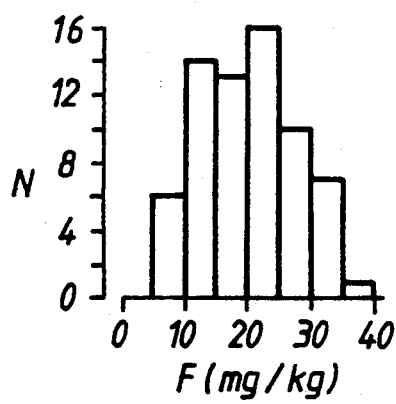
Figure 2D:
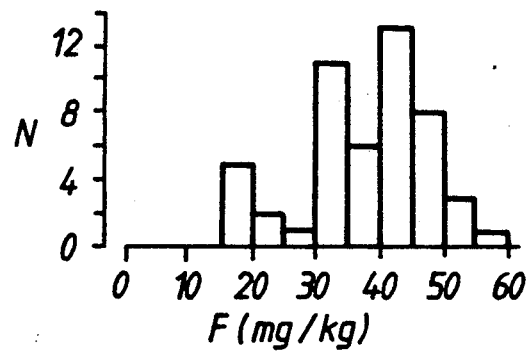

The action of the apparatus has been compared with various existing spray apparatus for applying fungicide to potato tubers. The fungicide used was thiabendazole at 40 grams per tonne of tubers. The fungicide was dissolved in an appropriate amount of water. FIGS. 2A, 2B, 2C show for existing apparatus the resulting amounts of F of fungicide (in milligrams/kilogram) against the number (N) of tubers. Generally half the fungicide is wasted as it is not deposited on the tubers. In some cases much more than half is wasted. Also some tubers received insignificantly small amounts. FIG. 2D shows the results for an embodiment of the invention. These indicate that about 38 grams of fungicide are deposited per tonne of tubers. This is about 95% of the fungicide dispersed by the sprayhead and shows a significant improvement in the use of the fungicide. Furthermore, the loss of fungicide to the environment is greatly reduced. All the tubers received a significant dose of fungicide.

In addition to the improvement in the proportion of spray reaching the tubers the uniformity of deposit over the surface of a tuber is improved. The small drops, less than 100 microns, produce more drops per unit area and increasing the volume of water for a given amount of fungicides produces more drops per unit area.

Figure 3:
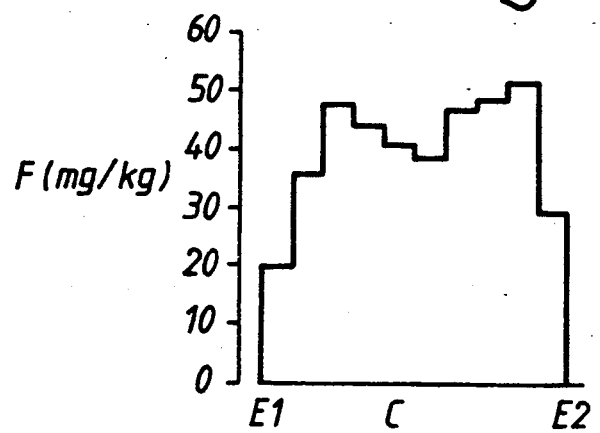
FIG. 3 shows variations in the fungicide deposit from one edge to the other using the present invention.

Furthermore the apparatus embodying the invention produced a relatively uniform level of fungicide deposit across the width of the table. FIG. 3 shows the variation of fungicide deposit (F) from one edge (E1) through the centre (C) to the other edge (E2) of the table for the same 40 grams of fungicide per tonne of tuber (in 400 millitres of water for 40 grams of fungicide). Again the enhanced minimum level ensures adequate dose rate.

Examination of plants and tubers resulting from cultivated seed tubers treated with fungicide by the apparatus embodying the invention shows significant improvement in resistance to disease.

Nearly 90% of plants from untreated tubers and 50% of the tubers from these plants showed signs of disease while only about 30% of plants from such treated tubers and 10% of the tubers from these plants showed signs of disease (in similar growing conditions). After storage the improvement was similar.

The electrostatic sprayhead with the extensive electrode inside a hood providing support and protection can thus produce a uniform deposit of material on harvested crops, even where winds or draughts occur, as in yards or warehouses, while avoiding waste of material or risk of contamination by material not reaching the harvested crop.

The apparatus described above provides an economic, tough, spray apparatus for treatment of harvested crop. The insulating surface to the hood both prevents air currents affecting the spray and prevents an operator making contact with high voltage areas. The surface can safely be touched in use.

I claim:

1. A spray apparatus for the treatment of a harvested crop, comprising:
   a high voltage electrostatic sprayhead,
   a sprayhood surrounding the sprayhead and having an aperture opposite the sprayhead, and
   insulating suspension means to suspend the sprayhood with the aperture adjacent a region of a conveyor to establish and maintain the sprayhood covering said region of said conveyor,
   the sprayhood having an insulating cover and an insulated electrode extending around and above said aperture,
   the electrode being energizable in operation to a potential similar to that applied to the sprayhead for applying an electrostatically charged spray from the sprayhead in a controlled manner throughout said region of the conveyor under the sprayhood to a quantity of crops conveyed past on the conveyor.

2. A spray apparatus according to claim 1 in which the sprayhood has a frame of ribs having on the inside means to receive an insulated wire to form the extensive electrode.

3. A spray apparatus according to claim 2 in which the insulating cover is of sheet material shaped to fit closely over the ribs.

4. A spray apparatus according to claim 2 in which an insulated wire is wound over the inside on the ribs as the electrode.

5. A spray apparatus according to claim 1 in which the sprayhood is of generally rectangular or square form with an apex at which the spearhead is placed.

6. A spray apparatus according to claim 1 in which the extensive electrode is a deposit of conducting material on an insulating surface.

7. A spray apparatus according to claim 1 including sprayhood support means and in which the suspension means includes insulated suspension links between the support means and the sprayhood.

8. A spray apparatus according to claim 7 in which the support means includes guide means to constrain crop to the conveying path.

9. A spray apparatus according to claim 1 in which the sprayhood has means for the attachment of the suspension means near to the apex of the sprayhood.

10. A spray apparatus according to claim 1 in which the electrode is such as to control a spray pattern across the conveyor.

11. A spray apparatus according to claim 1 including means for applying to said electrode a voltage having a plurality which is the same as that of the charge produced in operation on the spray and of similar value.

12. A spray apparatus according to claim 1 in which the sprayhood is arranged to produce spray particles of a volume median diameter less than 100 microns.

13. A spray apparatus according to claim 1 in which the electrode extends all over said insulating cover.

14. A spray apparatus according to claim 1 wherein said insulating cover is on the outside of said sprayhood and said electrode is inside said cover.

15. A spray apparatus for treating a harvested crop being conveyed along a conveyor, comprising:
    an electrostatic sprayhead for downwardly spraying toward said conveyed crop a cloud of charged droplets having a predetermined polarity, and
    a hood-shaped electrode means disposed around said sprayhead and extending transversely of said conveyor for a predetermined width and lengthwise thereof a given distance for controllingly spreading said cloud width wise and lengthwise of said path when having a charge of said predetermined polarity to cause said droplets to be distributed substantially uniformly over said path for an area determined by said predetermined width and given distance.

16. Spray apparatus as in claim 15 including a sprayhood having a bottom aperture and top and housing said electrode means which includes an electrode winding integrally around said sprayhead between said bottom aperture and said top and over said path to cover said area.

17. Spray apparatus as in claim 15 wherein said given distance said electrode means extends lengthwise of said path is at least approximately said predetermined width.

18. Spray apparatus as in claim 15 including a sprayhood having a bottom aperture and top for hosing said electrode means which includes insulated conductors radially extending between said top and bottom aperture to cover said area.

19. Spray apparatus as in claim 15 wherein said electrode means includes a metallic film superposing said area.

* * * * *